3,091,524
METALLURGICAL PROCESS
Arthur F. Johnson, Boulder, Colo., assignor to Strategic Materials Corporation, Buffalo, N.Y., a corporation of New York
No Drawing. Filed Oct. 23, 1959, Ser. No. 848,197
4 Claims. (Cl. 75—24)

This invention relates to the metallurgy of slags and the recovery of valuable metals therefrom, and has for its object the provision of an improved process for the treatment of slags and the recovery of metals in concentrated form and segregated or purified from other substances that would reduce the value of the metals. The process of the invention treats a molten alloy in contact with a molten slag concentrating the desired metal alternately within the slag and then within the alloy, and then separates the metal from the unwanted substances. The term "slag" as used herein refers to slags from various metallurgical operations such as reverberatory or converter slags, open hearth and Bessemer slags containing oxide metals and other elements such as are present in the slags.

In one of its aspects the invention treats iron silicate slags containing oxides of such metals as calcium, magnesium, aluminum, manganese, copper and uranium, as well as sulphur and phosphorus, although not all of such oxides may be present in appreciable amount in any one slag.

The molten alloy in contact with the slag components often contain carbon. In the practice of my invention the desired metal is made to enter the slag or enter the alloy by regulating the degree of oxidation or reduction within the slag and within the alloy. Oxidation within the slag may be effected by allowing the surface of the slag to contact the air, or by blowing air or oxygen into the slag. Similarly, oxidation within the alloy may be effected by blowing air or oxygen into the alloy with a lance.

Reduction within the slag may be effected by playing a stream of natural gas on or under the surface or by adding carbon to the slag.

Reduction within the alloy may be effected by adding carbon thereto continuously or periodically by blowing carbon in with a small amount of air; or by causing a mass of carbon to contact the alloy by means similar to that of an electrode suspended down into the alloy, or by lining the bottom of the furnace with carbon so that the alloy continuously rests on carbon. The alloy may be kept supplied with carbon by periodically withdrawing some alloy and returning it to the furnace at least partly saturated with carbon. The relative reducing effect of the alloy upon the slag may be controlled not only by the content of the alloy in reducing material, such as carbon, but by the extent of agitation of the alloy into the metal. For example, by blowing air or oxygen into a carbon containing alloy the alloy-slag interface can be agitated so that the slag is much more strongly reduced by the alloy carbides than if no air or oxygen were blown into the alloy. The reducing or oxidizing effect may be controlled by regulating the temperature of the materials. When an electric furnace is used, the electric current at least partly supplies the heat, but the oxidation of carbon in the alloy or other alloy constituents reacting with oxygen blown into the alloy supplies part, or in some cases, all the heat needed for the furnace. Thus, my invention chiefly utilizes the smelting ores and slags in which a ferrous alloy in molten form beneath the molten ore or slag is periodically or continuously supplied with carbon which dissolves in it and is continuously or periodically blown with oxygen for the combined purpose of heating the materials and reducing metal from the slag into the alloy. However, in one of the aspects of my invention I allow the carbon content of the ferrous alloy to be reduced to zero, or to so low a content that the iron content of the ferrous alloy constitutes the reducing agent acting on the slag. The following examples are illustrative of processes carried out according to my invention:

This example includes the recovery of iron from iron silicate slags by the methods outlined in my following copending applications: Serial Numbers 700,967, now abandoned, 742,945, 759,215, now Patent No. 2,986,458, 792,735 and 795,244, now Patent No. 3,032,411. Application Serial No. 795,244, now Patent No. 3,032,411, describes the removal of sulphur and copper impurities from an iron silicate slag by contacting the molten slag with a pool of molten iron and copper alloy. In this process large proportions (5% to 60%) of the iron are stripped from the slag when the copper and sulphur are reduced out of the slag into an alloy pool so the purified iron silicate slag is somewhat depleted of the iron, which iron it is desired to recover free of impurities in the next step of the process. The following example of my present invention permits a very high recovery of the iron since only an extremely small percentage need be lost in the elimination of the impurities, sulphur and copper, even though these impurities are stripped or washed out of the slag by the reduction of considerable proportions of iron. This will be understood by reference to the process steps listed below and the materials balance shown in the tables of Example I.

(1) A charge of copper smelter reverberatory furnace or converter furnace slag is poured, or preferably run by gravity launder, into a refractory lined furnace which may conveniently be an electric arc furnace as used for steel melting or a Tysland-Hole type furnace as developed in Europe for making pig iron. At the time that the slag is run into the furnace at least enough molten iron and copper alloy should be in the furnace to cover the bottom of the furnace. Provision may be made to utilize the hot gases from the furnace to calcine limestone or preheat solid pieces of copper smelter slag to be added to the surface of the molten slag to supplement slag or flux needs; and the preferred equipment for such limestone or slag preheating is a shaft-type of furnace which will feed by gravity into the electric furnace by appropriate means as, for example, illustrated in my application Serial No. 792,735. An example of the reverberatory slag composition is listed in Table A.

*Table A*

COMPOSITION OF 100 POUNDS OF COPPER REVERBERATORY SLAG ENTERING STEP (1) FOR PURIFICATION

| | Lbs. of constituent per 100 lbs. of slag entering step (1) | Percent of constituent in slag entering step (1) |
|---|---|---|
| FeO | 44.4 | 44.4 |
| $SiO_2$ | 38.5 | 38.5 |
| CaO | 6.9 | 6.9 |
| $Al_2O_3$ | 4.6 | 4.6 |
| S | 1.0 | 1.0 |
| Zn | 0.77 | 0.77 |
| MgO | 1.9 | 1.9 |
| CuO | 0.38 | 0.38 |
| Pb | 0.18 | 0.18 |
| As | 0.15 | 0.15 |
| Mn | 0.25 | 0.25 |
| Unaccounted for | 0.97 | 0.97 |
| | 100.00 | 100.00 |

(2) By the combined effect of carbon introduced with the slag charge, the electric current and the carbon-containing iron and copper pool beneath the slag, a sufficient amount of iron may be reduced from the slag into the alloy pool to carry with it the impurities such as sulphur and phosphorus and copper. In this step the slag must usually be heated up from the approximate 2400° F. at which it issues from the copper smelter to steel making temperature of about 2900° F. Actually both the heating up and the iron and impurity reduction process may be effected without the use of any electric current in the furnace by the use of one or more oxygen lances (similar to those conventional in the steel industry) through which oxygen is carried down to the surface of the molten, cast-iron pool. There the oxygen reacts with the carbon content of the iron-copper alloy heating it and agitating it into the slag floating upon it. As the carbon content of the iron-copper pool is reduced, its ability to absorb sulphur is increased. As the slag increases in temperature to steel making temperatures the carbon (as such, or contained in a hydrocarbon) fed with it reduces iron metal globules which settle through the slag carrying down with them the sulphur and copper impurities. In the material balance shown in Table A above the original FeO content of the incoming slag from the reverberatory copper smelter is 44.4%. After the reduction step of purification, wherein a third of the FeO is reduced into the iron-copper alloy, the slag runs about 35.48% FeO as shown in Table B.

*Table B*

CALCULATED COMPOSITION OF SLAG AFTER STEP (2) IN WHICH 30 LBS. OF FeO WAS OXIDIZED INTO SLAG FROM ALLOY POOL

|  | Lbs. of constituent in slag after step (2) | Percent of constituent in slag after step (2) |
|---|---|---|
| FeO (⅓ of FeO was reduced into alloy) | 29.6 | 35.48 |
| SiO₂ | 38.5 | 46.15 |
| CaO | 6.9 | 8.27 |
| Al₂O₃ | 4.6 | 5.52 |
| S (about 30% of S was reduced) | 0.7 | 0.84 |
| Zn (Zn was volatilized) | 0.0 | 0.00 |
| MgO | 1.9 | 2.28 |
| CuO (about 99% of Cu was reduced) | 0.0 | 0.00 |
| Pb (Pb was volatilized) | 0.0 | 0.00 |
| As (As was volatilized) | 0.0 | 0.00 |
| Mn | 0.25 | 0.30 |
| Unaccounted for | 0.97 | 1.16 |
|  | 83.42 | 100.00 |

(3) In this step of the process oxygen is blown into the iron-copper pool until all the carbon is oxidized therefrom and enough iron is oxidized to make the slag as a whole contain a few percent more FeO than it did originally. This does not mean that the percent of FeO in the slag will be more since it is desirable to add lime or limestone in this step so that the ratio of CaO plus MgO is to SiO₂ plus Al₂O₃ is about 0.7 to 1.0 or a little more. In Table C the percent FeO in the slag after the lime addition is shown to be 34.30%. The heat produced by oxidizing the iron from the iron-copper alloy serves to melt the limestone into the slag. Miscellaneous impurities in the slag such as zinc, lead and arsenic are volatilized during the heating and may be collected by conventional means in oxide form.

*Table C*

CALCULATED COMPOSITION OF SLAG AFTER STEP (3) IN WHICH FeO IN SLAG WAS INCREASED ABOUT 4% BY REOXIDATION OF Fe IN ALLOY CONTAINED IN PURIFICATION FURNACE AND 35 LBS. CaO FLUX WAS ADDED

|  | Pounds | Percent |
|---|---|---|
| FeO | 46.4 | 34.30 |
| SiO₂ | 38.5 | 28.48 |
| CaO | 41.9 | 30.99 |
| Al₂O₃ | 4.6 | 3.40 |
| S | 0.7 | 0.52 |
| Zn | 0.0 | 0.0 |
| MgO | 1.9 | 1.41 |
| CuO | 0.0 | 0.0 |
| Pb | 0.0 | 0.0 |
| As | 0.0 | 0.0 |
| Mn | 0.25 | 0.18 |
| Unaccounted for | 0.97 | 0.72 |
|  | 135.22 | 100.00 |

(4) In this process step the slag is again slightly reduced by the aid of the electric current and a small amount of carbon is added so that the slag contains approximately the weight of iron that it did upon introduction to the purification furnace. In this step any small amounts of reoxidized copper, sulphur or phosphorus entering the slag as a result of step (3) are again reduced into the iron-copper alloy pool. These results are shown in Table D.

*Table D*

CALCULATED COMPOSITION OF SLAG AFTER STEP (4) IN WHICH FeO IN SLAG WAS REDUCED TO POUNDS ORIGINALLY PRESENT IN REVERBERATORY SLAG

|  | Pounds | Percent |
|---|---|---|
| FeO | 44.4 | 33.34 |
| SiO₂ | 38.5 | 28.87 |
| CaO | 41.9 | 31.46 |
| Al₂O₃ | 4.6 | 3.45 |
| S | 0.7 | 0.53 |
| Zn | 0.0 | 0.0 |
| MgO | 1.9 | 1.43 |
| CuO | 0.0 | 0.0 |
| Pb | 0.0 | 0.0 |
| As | 0.0 | 0.0 |
| Mn | 0.25 | 0.19 |
| Unaccounted for | 0.97 | 0.73 |
|  | 133.22 | 100.00 |

(5) The slag purified in the foregoing steps is now transferred from the first furnace to a second furnace wherein it is quantitatively reduced of its iron to make cast iron of specification grade or steel as desired. In the above process the iron-copper alloy used in the purification furnace may be cast iron containing only a few percent of copper or may be of higher copper content as described in my patent application Serial No. 795,244, now Patent No. 3,032,411, so that it segregates into two more or less immiscible fractions the lower of which is the copper rich fraction and the upper of which is the iron rich fraction. The results of the operation in the second furnace are shown in Table E.

*Table E*

CALCULATED COMPOSITION OF SLAG AFTER STEP (5) IN WHICH PURIFIED SLAG HAS BEEN TRANSFERRED TO A SECOND FURNACE AND IRON QUANTITATIVELY REDUCED FROM IT

|  | Pounds | Percent |
|---|---|---|
| FeO | 0.5 | 0.56 |
| SiO₂ | 38.5 | 43.15 |
| CaO | 41.9 | 46.96 |
| Al₂O₃ | 4.6 | 5.16 |
| S | 0.6 | 0.67 |
| Zn | 0.0 | 2.13 |
| MgO | 1.9 | 0.0 |
| CuO | 0.0 | 0.0 |
| Pb | 0.0 | 0.0 |
| As | 0.0 | 0.0 |
| Mn | 0.25 | 0.28 |
| Unaccounted for | 0.97 | 1.09 |
|  | 89.22 | 100.00 |

When oxygen is introduced into the alloy at the bottom of the purification furnace to oxidize carbon or iron, it is introduced into the iron-rich fraction which adjoins the slag. Oxygen lances used are those conventionally used in steel furnaces and consists of lengths of black iron pipe from ⅜ inch diameter to ¾ inch diameter usually without water cooling jackets. When the copper-rich bottom fraction of the alloy is withdrawn so as to remove copper and sulphur impurities, it is sent to a copper converter or copper reverberatory for disposal. In the case where slags from power plants are used in the above process, the iron content of the slags being lower, the reduction illustrated in step (2) may not be desirable. Instead step (3) is applied after (1) and enough iron is oxidized into the slag to bring the slag up to 45% or 55% or more FeO computed on the weight of the original amount of slag introduced, and then limestone is added as outlined in step (3) above for reasons explained in the aforementioned patent applications. In the practice of step (4) with power plant slags enough iron is usually reduced to return the slag to about the iron content in pounds which it had upon introduction into the purification furnace. These methods give a very high degree of purification of the iron from sulphur and copper. Any contained phosphorus may be eliminated in the cast iron produced by my process by making Bessemer steel according to the original Bessemer process or its modern equivalent which uses an oxygen blow and thereby yields lower nitrogen content steel.

The above process is best conducted as a batch process in which the indicated reduction and oxidation steps are conducted on a batch of slag.

The purification step in the treatment of iron silicate slags may be conducted on a continuous basis. In this case the slag is flowed over the molten iron and copper alloy pool into which oxygen or air or a mixture of the two is blown. The iron content of the alloy pool acts as a reducing agent on the slag and the slag-alloy interface is agitated by the air or oxygen blown into the pool. Under these circumstances all the iron would oxidize out of the alloy pool into the slag, but the pool may be periodically made to be a reducing agent for iron by injecting carbon periodically into the pool. At the time when the alloy pool contains carbon, it reduces iron from the slag. When the alloy pool is exhausted from carbon, iron oxidizes from the pool into the slag. My preferred practice is not to add carbon into the alloy pool but to add a carbonaceous material on top of the slag or into the slag so that small globules of iron form around the carbon particles and settle through the slag into the alloy pool carrying the sulphur, phosphorus, copper and precious metals into the alloy pool where such impurities remain while the iron is reoxidized by the oxygen containing gas into slag at substantially the same rate or a little less than it is reduced by the carbon and settled into the alloy pool. The net amount of oxygen introduced is about the amount necessary to burn up the carbon added, since most of the iron is recycled, but it is the better practice to add a little more carbon than needed to balance the oxygen in which case a positive reducing condition is maintained and there is some accumulation of iron in the alloy pool to absorb the accumulating impurites. I may reduce as much as 20% of the iron contained in the slag in order to rid the slag of impurities, but I prefer to reduce less than 2% and periodically rid the alloy pool of impurities by putting it through a copper converter. Copper is added to the alloy pool to aid in the solution of impurities as revealed in my copending application Serial No. 795,244. By adding sufficient carbon to the slag or by use of a carbon lined furnace and by adding to the alloy pool enough heat may be generated within the process to operate it without the aid of outside fuel or electric power.

EXAMPLE II

This example illustrates a process of my invention in the recovery of ferromanganese from Bessemer and open hearth furnace run-off slags which usually contain from 5% to 35% of manganese. In this practice of my invention a single electric furnace may be used to make the purification step as well as the production of high percentage manganese, ferromanganese. The electric furnace is lined with carbon blocks below the slag line and contains a charge of molten cast iron when the first slag is introduced into it. Table J gives the composition of the slag.

*Table J*

COMPOSITION OF 100 POUNDS OF RUN-OFF SLAG FROM OPEN-HEARTH FURNACE ENTERING STEP (1)

| | Pounds | Percent |
|---|---|---|
| FeO | 42.45 | 42.45 |
| $Fe_2O_3$ | 9.58 | 9.58 |
| MnO | 9.80 | 9.80 |
| $SiO_2$ | 16.42 | 16.42 |
| CaO | 11.40 | 11.40 |
| $Al_2O_3$ | 1.25 | 1.25 |
| MgO | 4.76 | 4.76 |
| S | 0.08 | 0.08 |
| $P_2O_5$ | 3.17 | 3.17 |
| Unaccounted for | 1.09 | 1.09 |
| | 100.00 | 100.00 |

The principal steps in this variation of my process are as follows:

(1) A charge of Bessemer or open hearth slag is poured or preferably laundered by gravity into the electric furnace and heated to steel making temperatures of about 2900° F. Provision is preferably made to utilize the waste gases produced by this furnace to calcine limestone or preheat lumps of manganese containing slag used to supplement the molten slag used and to flux the slag. The preferred equipment for such preheating is a shaft type furnace an example of which is revealed in my application Serial No. 792,735.

(2) By the combined effect of the carbon in the pig iron in the bottom of the furnace and the coke or hydrocarbon charged and the high temperature produced by the electric current the iron, phosphorus and manganese in the slag together with part of the silicon therein is reduced into the cast iron pool as shown in Table K.

*Table K*

CALCULATED COMPOSITION OF SLAG OF STEP (3) AFTER TREATMENT OF STEPS (1) AND (2)

| | Pounds | Percent |
|---|---|---|
| FeO (Fe quantitatively reduced into crude alloy containing Fe, Mn and P) | 0.5 | 1.63 |
| $Fe_2O_3$ | 0.0 | 0.0 |
| MnO (Mn) | 0.5 | 1.62 |
| $SiO_2$ (Si partly reduced) | 11.07 | 35.90 |
| CaO | 11.40 | 37.02 |
| $Al_2O_3$ | 1.25 | 4.05 |
| MgO | 4.76 | 15.47 |
| S (partly reduced) | 0.04 | 0.13 |
| $P_2O_5$ (P quantitatively reduced) | 0.2 | 0.65 |
| Unaccounted for | 1.09 | 3.53 |
| | 30.81 | 100.00 |

The composition of the crude alloy produced in step (2) is shown in Table L.

*Table L*

CALCULATED COMPOSITION OF CRUDE ALLOY PRODUCED BY REDUCTION STEP (2)

| | Pounds | Percent |
|---|---|---|
| Fe | 39.2 | 76.0 |
| Mn | 7.09 | 13.73 |
| Si | 2.5 | 4.84 |
| C added in Step (2) | 1.5 | 2.91 |
| P | 1.3 | 2.52 |
| | 51.59 | 100.00 |

(3) The calcium-magnesium-aluminum-silicate slag having been stripped of substantially all of its iron, phosphorus and manganese and part of its silicon is poured out of the electric furnace to waste or to one of the uses outlined in my above mentioned copending patent applications.

(4) The process is continued by adding successively new amounts of slag, as in step (1), on top of crude iron, manganese and phosphorus alloy produced in step (2) and repetition of steps (2) and (3) on the new batches of slag until the capacity of the furnace for best overall efficiency in all steps considered from (1) to (8) is achieved.

(5) The alloy pool derived from step (2) is oxidized with oxygen-containing gas so that most of the manganese and, unavoidably, also some iron and some phosphorus, is oxidized into the slag.

(6) The alloy containing most of the iron and phosphorus is drawn from the furnace leaving behind the rich manganese slag produced in (5).

(7) Most of the remaining iron and phosphorus in the slag is then reduced with the aid of carbon or hydrocarbon and the heat of electricity into a newly formed alloy pool. Some manganese is unavoidably reduced also.

(8) The alloy produced in (7) is withdrawn from the furnace and may subsequently be used in step (1) of a new batch on account of its contained manganese.

(9) The high manganese slag produced in (5) and purified and segregated by (6), (7) and (8) is then reduced to 78%–82% manganese, ferromanganese, and delivered molten or at least hot to the Bessemer or open hearth process.

(10) The alloy of phosphorus and iron withdrawn by step (6) may be treated while in molten form in a Bessemer converter to purify it of phosphorus and to produce salable pig iron.

The process outlined above is most economic in the small amount of heat required since the slag is received molten in steps (1) and (4) and only a single furnace need be used for all steps. The use of only one furnace saves the great expense of raking the rich manganese slag out of the furnace above 3000° F. which would be necessary if this material were reduced in a separate furnace. Likewise the molten calcium silicate slag, having been stripped of its impurities, may be reused in the blast furnace, Bessemer converter, or open hearth furnace of the steel plant where also the molten ferromanganese may be used.

What I claim is:

1. In a process for upgrading molten basic slags containing desired metals by removing unwanted impurities therefrom, the improvements which comprise;
    (a) contacting said slag with a molten alloy within an electric furnace and at a suitable smelting temperature;
    (b) carbonaceously reducing into said alloy as much of the desired metal as is required to simultaneously reduce said unwanted impurities from said slag; and
    (c) blowing an oxygen-containing gas into the alloy to reoxidize at least a major portion of the desired metal back into the slag and retaining a major portion of impurities in the metal, whereby said slag is freed of unwanted impurities with only a small loss of the desired metal.

2. The process as claimed in claim 1, wherein said molten basic slag is a partially-purified slag which is provided by;
    initially reducing a slag with a sufficient carbonaceous reductant to quantitatively reduce both desired metals and impurities to the metallic state with the production of an impure alloy bath and a residual waste slag;
    discarding said waste slag;
    blowing an oxygen-containing gas into the alloy bath so as to oxidize substantially all of the desired metals but only a small portion of the unwanted impurities and form thereby a partially-purified slag and a molten alloy containing the major portion of said impurities.

3. The process as claimed in claim 1, wherein said basic slag contains manganese and iron from a steelmaking process, the purified slag is reduced, and a ferromanganese product containing over seventy percent (70%) manganese is recovered.

4. In a process for upgrading molten basic slags containing iron and manganese by removing unwanted impurities therefrom, the improvements which comprise;
    (a) carbonaceously reducing as much of said iron as is required to simultaneously reduce said unwanted impurities from said slag and forming thereby a molten bath of impure iron;
    (b) blowing an oxygen-containing gas into said bath to oxidize back into the slag at least a major portion of the reduced iron and retaining a major portion of impurities in the metal, the carbonaceous reductant employed in step (a) serving both to reduce said slag and provide at least part of the heat necessary to operate the process, and whereby said slag is freed of said impurities.

References Cited in the file of this patent

UNITED STATES PATENTS

| | | |
|---|---|---|
| 453,227 | Wilson | June 2, 1891 |
| 2,438,911 | Gronningsaeter | Apr. 6, 1948 |
| 2,687,952 | Buehl et al. | Aug. 31, 1954 |
| 2,732,293 | Perrin | Jan. 24, 1956 |